Patented Mar. 8, 1949

2,463,963

UNITED STATES PATENT OFFICE 2,463,963

METHOD OF PRODUCING A CARBAMINO SALT COMPOUND

Henry J. Gorcica, Prospect Heights, Ill., and Leo J. Novak, Decatur, Ind., assignors to Fearn Laboratories, Inc., Franklin Park, Ill., a corporation of Illinois No Drawing. Application February 12, 1948, Serial No. 8,018

4 Claims. (Cl. 260—534)

1

This invention relates to a method for producing a carbamino salt compound adapted for use as one of the components of a product for producing effervescing carbonated beverages, which forms the subject-matter of our co-pending application Serial No. 748,838, filed May 17, 1947, this application being a continuation in part of our joint application Serial No. 637,086, filed December 22, 1945, now abandoned.

The compound produced in accordance with our method is suitable for a variety of purposes, its employment in the production of effervescent carbonated beverages being merely one exemplification of the uses to which the product may be put.

In the production of the compound or compounds in accordance with our method, four constituents or ingredients are required, (1) An amino acid (non-toxic if the product is to be used for beverage purposes), for example, glycine, glutamic acid, alanine, or a mixture of amino acids, either pure or as a hydrolysate, for example soluble hydrolyzed neutral casein.

(2) A molecular reacting equivalent of a divalent basic metallic hydroxide, for example calcium hydroxide, magnesium hydroxide, or ferrous hydroxide. This ingredient also must be non-toxic if the product is for beverage or food purposes.

(3) Carbon dioxide.

(4) A substantially non-reactive, organic, water miscible, non-polar, neutral solvent preferably although not necessarily of relatively low boiling point, which will not react with carbon dioxide, amino acid or amino acids, or divalent basic metallic hydroxide as herein described. Suitable solvents of this character are methyl, ethyl, propyl alcohol, ethylene glycol, propylene glycol, acetone and glycerine and which solvents, as a class, may be defined as saturated aliphatic alcohols of not more than three carbon atoms.

The production of carbamino salt type of compound or compounds from these materials is effected in accordance with our method in the following manner.

An aqueous solution either saturated or partially saturated is first prepared by mixing a weighed amount of the amino acid or acids for example glycine or glutamic acid with a measured volume of cold water. To this solution mixture is then added a suitable organic solvent such as above indicated, or a mixture of two or more of these compounds, until preferably a 66⅔% organic solvent or solvents and 33⅓% water is obtained. In this solvent a ¼ molar solution of the

2 amino acid or amino acids liquid mixture is prepared. A few drops of phenolphthalein indicator are now added. While the proportions of water and solvent as given above are preferred the proportions may be varied over a considerable range i. e. water 10% to 50% and solvent 90% to 50%, respectively.

A molecular reacting equivalent of divalent basic metallic hydroxide, for example calcium hydroxide, is then weighed and made into a thick liquid suspension with a minimum amount of the 66⅔% organic solvent or solvents—33⅓% water solution, using the above stated preferred proportions of water and solvent. This liquid suspension is then added to more of the 66⅔% organic solvent or solvents-33⅓% water mixture of amino acid or acids until the latter mixture is pink to phenolphthalein indicator. This solution mixture is now cooled in a closed pressure container with suitable stirring apparatus to 0–20° C., stirred, and carbon dioxide is passed in at a slow rate until the solution mixture just loses the pink color. More basic hydroxide-organic solvent-water-solution mixture is added with stirring until the reacting mixture turns a definite pink again. More carbon dioxide is again added as previously described until the pink color again just fades. This process is repeated until all the basic hydroxide-organic solvent-water mixture is added. Carbon dioxide at higher pressure for example 30–40 lbs. per square inch is now passed in until no more is absorbed.

The final reacted mixture is now removed from the reaction vessel by blowing it out with carbon dioxide under pressure. It is filtered cold, washed with a low boiling point, miscible, non-reactive, nonpolar, cold, organic solvent if necessary (for example if ethylene glycol was used in 66⅔% concentration in the reaction, the residue of carbamino compound or compounds on the filter must be washed with acetone) then gently air or vacuum dried at a low temperature, for example 50–80° C.

The product obtained consists substantially of compounds having the following general formulae:

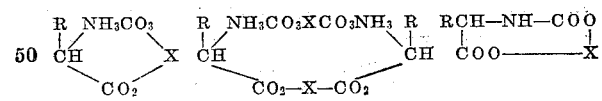

Some carbonate of calcium may be formed, depending upon such factors as, for example, solvent and reaction rates. The reactions occurring during the aforementioned method of preparation are represented substantially as follows:

(1)

RCHNH₂COOH + X(OH)₂ + CO₂

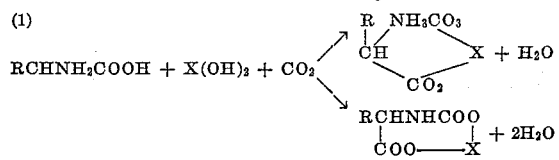

(2) 2RCHNH₂COOH + 2X(OH)₂ + 2CO₂ ⟶

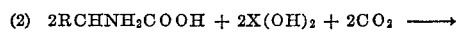
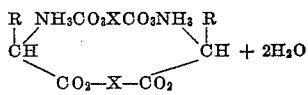

In these reactions,
X=Ca⁺⁺, Mg⁺⁺, Fe⁺⁺
R=An organic radical or hydrogen for example CH₃, C₂H₅, C₃H₇, C₄H₉, C₅H₁₁, C₆H₅CH₂, COOH(CH₂)₂, COOHCH₂, etc.

A typical illustration of our method is exemplified by the following procedure.

To 4.5 liters of pure water is added 281 grams of glycine (amino-acetic acid), the mixture is stirred and 10.5 liters of 95% ethyl alcohol is added. The ratio or proportions of water to solvent may be varied over a considerable range, the preferred range being proportions of from 10% to 50% of water to 90% to 50% solvent. 280 grams of pure calcium hydroxide, preferably free of calcium carbonate is mixed into a minimum of 33⅓% water and 66⅔% ethyl alcohol to form a thick liquid suspension. This calcium hydroxide liquid suspension is now added to the aminoacetic acid-water-ethyl alcohol mixture containing a few drops of phenolphthalein until a distinct pink-red color is obtained. This mixture is now cooled to 0–10° C., in a suitable closed pressure reaction vessel equipped with stirrer. While this liquid is being stirred, carbon dioxide is introduced under a pressure of 1 to 2 pounds per square inch until the pink-red color just fades. More of the calcium hydroxide-water-ethyl alcohol liquid mixture is then added with stirring until the solution mixture turns pink again. More carbon dioxide is again passed in until the color just fades again. This process is repeated until all the calcium hydroxide has been added and the pink color of phenolphthalein has just faded due to carbon dioxide absorption. Carbon dioxide is then passed in at from, for example, 30–50 pounds per square inch until no more is absorbed. The mixture is then removed from the reaction vessel preferably by blowing it out with carbon dioxide and filtered while cold, washed with cold acetone or 95% ethyl alcohol to remove most of the water, and gently vacuum dried at for example, a temperature of 50–70° C., and 25–30 inches vacuum, or it can be air dried at for example 50–80° C.

Preferably the ground material is then graded into granular sizes by being passed through sieves of selected mesh sizes. The thus graded granules may then be employed in selected proportions as constituents of the product for producing effervescent carbonated beverages disclosed in our aforementioned co-pending application.

A carbamino salt type of compound produced in accordance with our method above disclosed includes or carries a substantial amount of carbon dioxide in condition to be liberated for effervescent and carbonation purposes by subjection to the action of a suitable acid in the presence of water. Furthermore, the solid constituents of the compound are readily soluble in water, consequently, when the compound is employed for beverage making purposes, the entire composition is either dissolved in the water or liberated as carbon dioxide so that no objectionable residue is left in the bottom of the glass.

Our process as above disclosed is obviously capable of modification in its details without departing the scope of our invention as defined in the following claims.

We claim:

1. The method of producing a carbamino salt type of compound or compounds which comprises adding a measured amount of amino acid or acids having a free primary amino group to a solution consisting of water and a solvent of the class of saturated aliphatic alcohols of not more than three carbon atoms in proportions of from 10% to 50% water and 90% to 50% solvent, then adding at periodic intervals a molecular reacting equivalent of a divalent basic metallic hydroxide, maintaining the pH of the mixture above 5.8, and saturating the solution while being agitated under controlled pressure and temperature with carbon dioxide.

2. The method of producing a carbamino salt compound which comprises mixing with an amino acid compound solution, a solvent of the class of saturated aliphatic alcohols of not more than three carbon atoms in proportions of from 10% to 50% solution and 90% to 50% solvent, adding to such mixture a molecular reacting equivalent of a divalent basic metallic hydroxide, agitating the resulting mixture under pressure, and introducing into said mixture while being agitated under pressure sufficient carbon dioxide to substantially saturate the solution.

3. The method of producing carbamino salt compounds which comprises mixing with an amino acid compound water solution a solvent of the class of saturated aliphatic alcohols of not more than three carbon atoms in proportions of from 10% to 50% solution and 90% to 50% solvent, adding calcium hydroxide to the mixture until the mixture is only slightly acid, and impregnating said mixture with carbon dioxide while being subjected to agitation under pressure.

4. The method of producing carbamino salt compounds which comprises mixing with an amino acid compound water solution, a solvent of the class of saturated aliphatic alcohols of not more than three carbon atoms in proportions of from 10% to 50% solution and 90% to 50% solvent, adding to such mixture a suspension of calcium hydroxide in a carrier of water diluted saturated aliphatic alcohol of not more than three carbon atoms until neutrality of the mixture is closely approached, and saturating said mixture with carbon dioxide while subjected to pressure and agitation.

HENRY J. GORCICA.
LEO J. NOVAK.

REFERENCES CITED

The following references are of record in the file of this patent:

UNITED STATES PATENTS

| Number | Name | Date |
|---|---|---|
| 1,948,002 | Mittasch et al. | Feb. 20, 1934 |

FOREIGN PATENTS

| Number | Country | Date |
|---|---|---|
| 188,005 | Germany | Sept. 6, 1907 |

(Other references on following page)

OTHER REFERENCES

Siegfried, Zeit fur physiol. Chem., vol. 44, pages 85–95 (1905).

Siegfried et al., Zeit fur physiol. Chem., vol. 54, pages 423–436 (1908).

Seigfried et al., Zeit fur physiol. Chem., vol. 81, pages 260–273 (1912).

Spothr et al., Chem. Abstracts, vol. 20, page 2181 (1926).

Majer, Chem. Abstracts, vol. 23, page 728 (1929).

Boyd, Biochem. Journal, vol. 27, pages 1838–1848 (1933).

Stadie et al., Jour. Biol. Chem., vol. 112, pages 723–732 (1936).